(12) United States Patent  
Guo

(10) Patent No.: US 9,979,955 B1  
(45) Date of Patent: *May 22, 2018

(54) CALIBRATION METHODS FOR NEAR-FIELD ACOUSTIC IMAGING SYSTEMS

(71) Applicant: Apple Inc., Cupertino, CA (US)

(72) Inventor: Jian Guo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/640,007

(22) Filed: Mar. 5, 2015

Related U.S. Application Data

(60) Provisional application No. 62/057,865, filed on Sep. 30, 2014.

(51) Int. Cl.

| | | |
|---|---|---|
| *G10K 11/16* | (2006.01) | |
| *G06N 3/04* | (2006.01) | |
| *G01S 15/02* | (2006.01) | |
| *G06K 9/00* | (2006.01) | |
| *G01C 19/5776* | (2012.01) | |
| *H03L 7/097* | (2006.01) | |
| *H03K 5/13* | (2014.01) | |
| *G01N 21/65* | (2006.01) | |
| *G01N 15/14* | (2006.01) | |
| *H04N 17/00* | (2006.01) | |
| *G06K 9/46* | (2006.01) | |
| *H04N 5/376* | (2011.01) | |
| *H04N 7/18* | (2006.01) | |

(52) U.S. Cl.  
CPC ............ *H04N 17/002* (2013.01); *G06K 9/46* (2013.01); *H04N 5/3765* (2013.01); *H04N 7/18* (2013.01)

(58) Field of Classification Search  
CPC ...... H04N 17/002; H04N 5/3765; H04N 7/18; G06K 9/46  
USPC .......................................................... 348/77  
See application file for complete search history.

(56) References Cited

U.S. PATENT DOCUMENTS

| | | |
|---|---|---|
| 4,729,128 A | 3/1988 | Grimes |
| 4,868,430 A * | 9/1989 | Stewart .................. H03K 5/131 327/279 |
| 5,162,618 A | 11/1992 | Knowles |
| 5,381,696 A | 1/1995 | Ichinose |
| 5,515,298 A | 5/1996 | Bicz |
| 5,589,636 A | 12/1996 | Bicz |
| 5,719,950 A | 2/1998 | Osten |
| 5,886,452 A | 3/1999 | Toda |
| 6,091,406 A | 7/2000 | Kambara |
| 6,159,149 A | 12/2000 | Erikson |
| 6,164,135 A | 12/2000 | Bicz |
| 6,720,712 B2 | 4/2004 | Scott |

(Continued)

FOREIGN PATENT DOCUMENTS

WO   WO 94/002911   2/1994

*Primary Examiner* — Hee-Yong Kim  
(74) *Attorney, Agent, or Firm* — Brownstein Hyatt Farber Schreck, LLP

(57) ABSTRACT

An acoustic fingerprint imaging system is disclosed. In one embodiment, a controller can be coupled to a plurality of delay lines, each associated with a particular transducer. The controller can determine an interrogation point to focus acoustic energy. The controller can direct each of the plurality of delay lines to apply a delayed activation pulse to each transducer based, at least in part, on the transducer's distance from the interrogation point.

20 Claims, 11 Drawing Sheets

(56) References Cited

U.S. PATENT DOCUMENTS

| | | |
|---|---|---|
| 7,400,750 B2 | 7/2008 | Nam |
| 7,458,268 B2 | 12/2008 | Schneider et al. |
| 7,497,120 B2 | 3/2009 | Schneider et al. |
| 7,568,391 B2 | 8/2009 | Schneider et al. |
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,508,103 B2 | 8/2013 | Schmitt et al. |
| 8,536,465 B2 | 9/2013 | Hagiwara et al. |
| 8,576,202 B2 | 11/2013 | Tanaka et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,692,812 B2 | 4/2014 | Hecht |
| 8,724,869 B2 | 5/2014 | Schneider et al. |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,201,546 B2 | 12/2015 | Son et al. |
| 9,323,393 B2 | 4/2016 | Djordjev et al. |
| 9,465,972 B2 | 10/2016 | Chung et al. |
| 9,607,203 B1 | 3/2017 | Yazdandoost et al. |
| 9,613,246 B1 | 4/2017 | Gozzini et al. |
| 9,824,254 B1 | 11/2017 | Yazdandoost et al. |
| 9,904,836 B2 | 2/2018 | Yazdandoost et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1 | 12/2004 | Polcha |
| 2006/0196271 A1 | 9/2006 | Jancsik et al. |
| 2008/0142571 A1 | 6/2008 | Yokozuka et al. |
| 2008/0175450 A1 | 7/2008 | Scott |
| 2009/0167704 A1 | 7/2009 | Terlizzi et al. |
| 2012/0092026 A1 | 4/2012 | Liautaud et al. |
| 2013/0015868 A1 | 1/2013 | Peng |
| 2014/0254816 A1* | 9/2014 | Kim .................... G10K 11/16 381/71.11 |
| 2014/0333328 A1 | 11/2014 | Nelson et al. |
| 2014/0352440 A1 | 12/2014 | Fennell et al. |
| 2014/0355381 A1* | 12/2014 | Lal ..................... B81B 3/0021 367/87 |
| 2014/0359757 A1 | 12/2014 | Sezan et al. |
| 2015/0053006 A1 | 2/2015 | DeCoux et al. |
| 2015/0056645 A1* | 2/2015 | Vacca ............... G01N 15/1459 435/29 |
| 2015/0160012 A1* | 6/2015 | Il ....................... G01C 19/5776 73/504.12 |
| 2015/0185898 A1 | 7/2015 | Masson et al. |
| 2015/0189136 A1 | 7/2015 | Chung et al. |
| 2015/0192547 A1 | 7/2015 | Lee et al. |
| 2015/0358740 A1 | 12/2015 | Tsai et al. |
| 2016/0063300 A1 | 3/2016 | Du et al. |
| 2016/0117541 A1 | 4/2016 | Lu et al. |

* cited by examiner

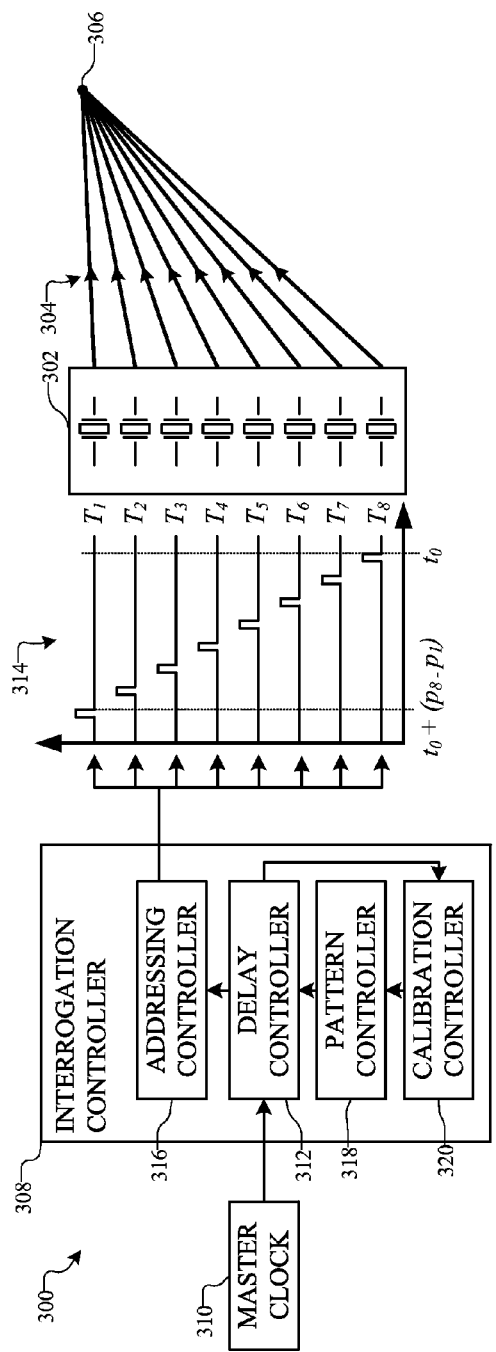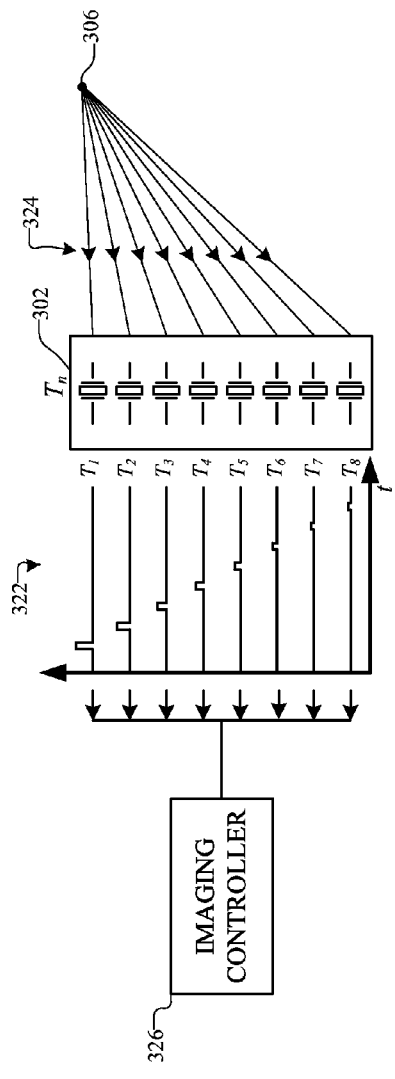
FIG. 3A
FIG. 3B

CALIBRATION METHODS FOR NEAR-FIELD ACOUSTIC IMAGING SYSTEMS

CROSS-REFERENCE TO RELATED APPLICATIONS

This application is a nonprovisional patent application of, and claims the benefit to, U.S. Provisional Patent Application No. 62/057,865, filed Sep. 30, 2014 and titled "Calibration Methods for Near-Field Acoustic Imaging Systems," the disclosure of which is hereby incorporated herein in its entirety.

TECHNICAL FIELD

This disclosure relates generally to security features for electronic devices, and more particularly, to systems and methods for operating and calibrating acoustic biometric imaging systems.

BACKGROUND

Many electronic devices include security features to prevent unauthorized access. For example, an electronic device can include a biometric sensor configured to establish a user's identity by determining whether obtained biometric data matches known biometric data of an authorized user. A fingerprint imaging system is one example of a biometric sensor.

In many cases, the performance of a biometric sensor may be affected by the precision with which biometric data can be detected. Although increased precision may lead to improved security for the electronic device, it may also result in a physical reduction in the size of one or more components of the sensor. For example, a high-precision fingerprint imaging system may require smaller imaging sensors than low-precision imaging systems.

Furthermore, the quality of a signal obtained from physically smaller components is often negatively affected by the components' smaller size. For example, small imaging sensors may detect less image information than large imaging sensors, generating lower-amplitude signals that may be more sensitive to interference. In other cases, small imaging sensors may be more susceptible to signal distortion from environmental conditions (e.g., temperature, pressure, humidity, and so on) than larger imaging sensors.

To account for the lower signal quality that may be associated with smaller components, many high-precision biometric sensors require close physical proximity (e.g., less than a millimeter) to a user in order to obtain a signal of sufficient quality. In other cases, biometric sensors may require advanced signal processing capability, which may undesirably increase power consumption and processing delays of the system.

As a result, high-precision biometric sensors are often challenging to include within the housing of an electronic device. For example, a biometric sensor positioned within a millimeter of the exterior of a housing may be at substantial risk of impact damage. In other examples, advanced signal processing capability may not be conveniently implemented by an electronic device with limited power and/or processing resources.

Accordingly, there may be a present need for improved high-precision biometric sensors.

SUMMARY

Embodiments described herein take the form of a fingerprint imaging system including a substrate having a surface (e.g., interrogation surface) that receives a subject for imaging (e.g., pad of a finger). The fingerprint imaging system can direct an acoustic pulse toward the interrogation surface and thereafter monitor for and obtain an acoustic reflection (e.g., echo) from the interrogation surface. By analyzing the acoustic reflection for variations an image of the subject can be captured.

In many embodiments, the imaging system includes a plurality of transducers in acoustic communication with the substrate. The plurality of transducers can be distributed in an array along a surface of the substrate opposite the interrogation surface. Each transducer can be configured to generate an acoustic output (e.g., pulse, wave, and so on) into the substrate in response to an electronic activation pulse. In one embodiment, an electronic activation pulse can be short in duration (e.g., nanosecond time scale) so as to provide a punctuated acoustic output. The imaging system can also include a controller configured to provide electronic activation pulses, separately, to each transducer such that the acoustic output produced by each respective transducer arrives substantially simultaneously at a single point (hereinafter "interrogation point") of the interrogation surface.

Some embodiments described herein may take the form of an imaging controller in communication with a plurality of acoustic transducers coupled to the bottom surface of a substrate, the imaging controller including at least a pattern controller for selecting an interrogation point on the top surface of the substrate and a delay controller configured to provide an electronic activation pulse separately to each transducer of the plurality of acoustic transducers, such that an acoustic output produced by each respective acoustic transducer arrives at the interrogation point substantially simultaneously.

Further embodiments described herein may relate to a configurable pulse delay line coupled to each of a plurality of acoustic transducers. In some cases, each delay line may be formed from two distinct delay stages. In some examples, each delay stage may be formed from a plurality of independently selectable delay blocks.

In some embodiments, individual delay blocks can have a fixed delay. In other examples, individual delay blocks can have a variable delay (e.g., voltage-controlled delay, current-controlled delay, variable capacitive loading, and so on). For example, some delay blocks can include a two inverter delay element in which the second delay element is implemented as a plurality of individual inverters arranged in parallel, each configured to be selectively enabled or disabled.

Additional embodiments described herein may relate to, include, or take the form of a method of calibrating a fingerprint imaging system having a delay line with a plurality of delay blocks, the method including at least the operations of selecting a delay block from the plurality of delay blocks, applying a calibration signal to the selected delay block, timing the output of the delay block, and comparing the timing of the output of the delay block to the calibration signal. In addition, upon determining that the output of the delay block may be too large, the method may reduce the delay of each delay block in the plurality of delay blocks, or upon determining that the output of the delay block may be too small, the method may increase the delay of each delay block in the plurality of delay blocks. In other embodiments, the method may decrease the delay of one or more delay block in the plurality of delay blocks.

Further embodiments described herein may relate to, include, or take the form of a method of calibrating a fingerprint imaging system having a delay line, the method including at least the operations of applying a calibration signal to the input of the delay line and comparing the phase of the output of the delay line to the phase of the calibration signal. In addition, upon determining that the phase of the calibration signal leads the phase of the output of the delay line, the method can increase the delay of the delay line.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

FIG. 3A depicts a simplified signal flow diagram of an acoustic fingerprint imaging system in an interrogation mode.

FIG. 3B depicts a simplified signal flow diagram of the acoustic fingerprint imaging system of FIG. 3A in an imaging mode.

The use of the same or similar reference numerals in different drawings indicates similar, related, or identical items where appropriate.

DETAILED DESCRIPTION

Figure 1:
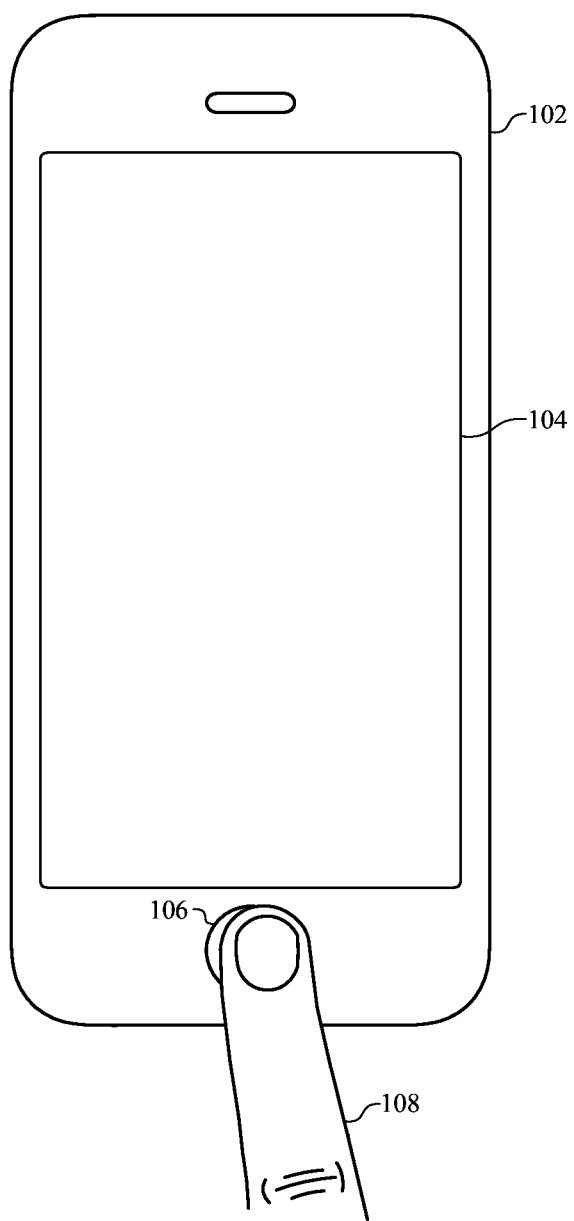
FIG. 1 depicts an example electronic device that can include an acoustic fingerprint imaging system.

Embodiments described herein relate to methods and systems for calibrating and operating acoustic imaging systems. Although many embodiments are described herein with reference to fingerprint imaging systems for use with portable electronic devices, it should be appreciated that some embodiments can take other forms, can be used to image other biometric or non-biometric characteristics or objects, and may be included within different form factors. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to a particular embodiment to the exclusion of others.

Many embodiments described herein relate to acoustic imaging systems that can be used, in one example, to obtain an image of a fingerprint. For example, an imaging system can include a plurality of acoustic transducers that are arranged on a surface (e.g., top or bottom surface) of a substrate. In some examples, the plurality of acoustic transducers can be arranged in a pattern such as a grid. To capture an image of an object engaging a top surface of the substrate (e.g., user's finger, stylus tip, and so on), the imaging system can cause one or more of the acoustic transducers to direct an acoustic pulse toward the top surface. When the acoustic pulse reaches the top surface, a portion of the acoustic pulse may be reflected back towards the plurality of transducers as a result of the acoustic boundary (e.g., acoustic impedance mismatch) between the top surface and the object engaging it.

In many cases, one or more of the transducers may be used to capture a portion of the acoustic reflection as one or more electrical signal(s). By analyzing the electrical signal(s) corresponding to the acoustic reflection, an image may be derived of the portion of the object engaging the top surface of the substrate. For one example, if the object engaging the substrate is a user's finger, the derived image may be an image of the user's fingerprint.

However, for certain embodiments, the quality of the derived image may be directly affected by attenuation of the acoustic reflection resulting from a variety of factors such as environmental interference, the acoustic impedance of the object engaging the touched surface, the materials selected for the substrate and/or other components of the imaging system, and so on. For example, an acoustic pulse may not propagate through the substrate uniformly and as a result, the acoustic reflection and the image derived therefrom can be distorted. In other examples, differences in temperature, humidity, and pressure may cause an acoustic pulse to propagate at an unexpected or unknown rate, resulting again in distortion of the acoustic reflection and/or derived image.

Accordingly, to mitigate the effects of attenuation, many imaging systems described herein can assemble a composite image from a plurality of independently collected acoustic reflections, instead of deriving an image from a single acoustic reflection. For example, an imaging system can activate each of the acoustic transducers in a particular temporal pattern such that the acoustic pulses produced by the transducers can constructively interfere at an interrogation point of the top surface of the substrate. In this manner, the magnitude of the effective acoustic pulse impacting the interrogation point is increased, which in turn increases the magnitude of the resulting acoustic reflection.

Once the acoustic reflection corresponding to the selected interrogation point is received and processed, the imaging system may select another interrogation point to target. In some examples, the acoustic reflection from a particular interrogation point can correspond to a sub-area of a final composite image. In other examples, a single interrogation point can correspond to a single pixel or a sub-pixel of a final composite image.

The temporal pattern provided to the transducers by the imaging system can take the form of a series of specifically-timed electronic activation pulses. In one example, the imaging system can provide each electronic activation pulse based, at least in part, on the physical dimensions and acoustic impedance of the substrate. For example, the imaging system can triangulate a distance between a particular transducer and an interrogation point. Next, the propagation time of an acoustic pulse though the substrate can be calculated based on the triangulated distance and the acoustic impedance of the substrate. In other examples, the propagation time between a particular interrogation point and particular transducer can be calculated beforehand and stored in a database or lookup table. In further examples, the propagation time between a particular interrogation point and a particular transducer can be measured directly by the imaging system.

By determining the propagation time between the interrogation point and each transducer, the imaging system can determine an appropriate activation time for each transducer so each acoustic pulse arrives at the selected interrogation point at substantially the same time.

In some embodiments, the imaging system can also vary the amplitude of the electronic activation pulses of individual transducers based on an expected attenuation of the acoustic pulse through the substrate. For example, an acoustic pulse emitted from transducer that is farther from an interrogation point can have greater amplitude than an acoustic pulse emitted from a transducer that is closer to an interrogation point. In this manner, by determining the attenuation between the interrogation point and each transducer, the imaging system can determine an appropriate activation amplitude for each transducer so each acoustic pulse arrives at the selected interrogation point at substantially the same amplitude.

However, for many embodiments, especially those having a small form factor, a substrate can be exceptionally thin (e.g., one millimeter or less) and may be made from a hard and/or dense material having a high acoustic impedance (e.g., glass, sapphire, zirconia, metals and so on). A thin substrate formed from a material with high acoustic impedance will propagate an acoustic pulse from its bottom surface to its top surface exceptionally quickly.

For example, typical glass may have an acoustic impedance of 12 MRayl, which for typical density can correspond to a longitudinal sound velocity of approximately 5500 m/s. Thus, the time required for sound to travel through 1 mm of glass may be approximately 180 ns. For denser materials, such as sapphire, which may have an acoustic impedance approximately of 44 MRayl corresponding (for typical density) to a longitudinal sound velocity of approximately 10,000 m/s, an acoustic pulse may propagate from a bottom surface to a top surface in as little as 100 ns.

In addition, the difference in propagation distance between adjacent transducers may be exceptionally small. For example, certain fingerprint imaging systems may position adjacent transducers 0.05 mm apart, so as to provide a fingerprint image with a resolution of approximately 200 pixels/cm or ~500 pixels/in. In this example, one may appreciate that, geometrically, the maximum difference in propagation distance between adjacent transducers is when an interrogation point is directly above one of the two adjacent transducers. For example, with a 1 mm substrate, the propagation distance for a first transducer $T_1$ positioned directly below a selected interrogation point may be 1 mm. From the Pythagorean theorem (presuming a planar and parallel substrate), it can be determined that the propagation distance for a second transducer $T_2$ (separated from $T_1$ by 0.05 mm) may be 1.001 mm. In this example, the acoustic pulse from the first transducer $T_1$ may arrive at the interrogation point in 180 ns through a glass substrate, or in 100 ns through a sapphire substrate. Similarly, an acoustic pulse from the second transducer $T_2$ may arrive at the interrogation point in 180.18 ns through a glass substrate or in 100.1 ns through a sapphire substrate. As a result of the longer propagation time of the pulse from the second transducer, the imaging system may activate the second transducer before the first transducer. In other words, the imaging system in this example can activate the second transducer $T_2$ at time $t_0$ and the first transducer $T_1$ at time $t_0+0.18$ ns for a glass substrate or $t_0+0.1$ ns for a sapphire substrate.

Thus, to ensure that each acoustic pulse emitted from each transducer arrives at a particular interrogation point at the same time, the imaging system of many embodiments may require timing accuracy on the nanosecond and/or picosecond scale.

Accordingly, many embodiments described herein relate to high-accuracy delay lines and delay blocks (and methods of calibrating the same), for example, for use with picosecond-scale acoustic imaging systems. Other embodiments can relate to other time scales such as nanosecond-scale (or other time scale) acoustic imaging systems. In many examples, each transducer of a plurality of transducers may be coupled to a picosecond-accurate delay line that is configured for selectable delay. In this manner, each individual transducer may receive its respective activation pulse at a specific time. In other words, the imaging system can send activation pulses for each transducer into the plurality of delay lines which, in turn, delay the activation of each transducer by a selected amount.

For example, an imaging system can determine that an acoustic pulse from a first transducer $T_1$ may require less propagation time $p_1$ to reach an interrogation point than an acoustic pulse from a second transducer $T_2$ that requires a longer propagation time $p_2$. Accordingly, the imaging system may delay activation of the first transducer by an amount $p_r$ that is substantially equal to the absolute value of the propagation time difference between the two acoustic pulses (e.g., $|p_1-p_2|=p_r$). In this example, the second transducer can be activated at time $t_0$ and the first transducer can be activated act time $t_0+d_r$.

FIG. 1 depicts an example electronic device that can include an acoustic fingerprint imaging system. In the present example, the electronic device 100 can be implemented as a portable electronic device such as a cellular phone. The electronic device 100 can include a housing 102 and a display 104. The display 104 can be disposed below a protective layer (e.g., cover glass) to protect the display 104 from damage. In many cases, the protective layer can be formed from an optically transparent and mechanically rigid material such as glass, sapphire, polycarbonate, and the like.

In many examples, the display 104 may include one or more of a variety of display elements. For example, the display 104 may include a liquid crystal display (LCD), a thin film transistor display (TFT), an organic light emitting diode display (OLED), organic electroluminescence (OEL) display, or other type of display. The display 104 may be used to present visual information to the user and may be operated in accordance with one or more display modes or the software applications being executed on the electronic device 100. In many cases, the display 104 can include or operate in conjunction with one or more touch input devices. For example, the display 104 may be configured to receive touch, gesture, and/or force input.

The electronic device 100 can also include one or more input elements such as a button 106. The button 106 may be a physical button such as a push button or switch. In other examples, the button 106 can be a touch input device that does not physically depress such as a capacitive button. In other cases, the button 106 can be a virtual button shown on the display 104.

In many embodiments, an acoustic fingerprint imaging system (not shown) can be positioned below a portion of the protective layer that may regularly receive a user's touch input. For example, the acoustic fingerprint imaging system can be positioned below the button 106. In this manner, each time the user 108 presses the button 106, the acoustic fingerprint imaging system can be activated. Once an image of fingerprint of the user 108 is obtained by the acoustic fingerprint imaging system, the obtained image can be compared to a database of known fingerprint images to determine if the obtained fingerprint image matches a known fingerprint image.

In some embodiments, the acoustic fingerprint imaging system can be positioned below the display 104. For example the acoustic fingerprint imaging system can be positioned below the display element associated with the display 104. In other examples, the acoustic fingerprint imaging system can be at least partially transparent and can be disposed above the display element associated with the display 104. In this manner, an image of a fingerprint may be obtained by touching any portion of the display 104.

In other examples, the acoustic fingerprint imaging system can be positioned within the sidewall of the housing 102. In this manner, when a user grips the electronic device 100, an image can be obtained of one or more fingerprints or palm prints of the user. In still further examples, more than one acoustic fingerprint imaging system can be included within the electronic device 100. For example, a first acoustic imaging system can be included below (or within) the button 106, and a second acoustic imaging system can be included below (or within) the display 104.

Figure 2A:
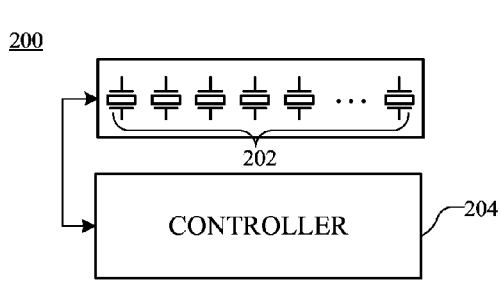
FIG. 2A depicts a simplified block diagram of an acoustic fingerprint imaging system.

FIG. 2A depicts a simplified block diagram of an acoustic fingerprint imaging system that can be used with the electronic device 100 of FIG. 1. The acoustic fingerprint imaging system 200 can include one or more acoustic transducers 202. The acoustic transducers 202 can contract or expand rapidly in response to an electrical stimulus such as a voltage or current (e.g., they may be electroacoustic transducers). For example, the acoustic transducers 202 can be formed, in certain embodiments, from a piezoelectric material. In other examples, the acoustic transducers 202 may be formed as a component configured to rapidly displace in response to an electrical stimulus such as a voltage or current (e.g., such as a voice coil).

In many embodiments, the acoustic transducers 202 can be configured to both emit and detect acoustic signals. In other words, an acoustic transducer of the acoustic transducers 202 can be used to both transmit an acoustic pulse in response to an electrical stimulus and, in addition, can generate an electrical signal in response to an acoustic input.

Figure 2B:
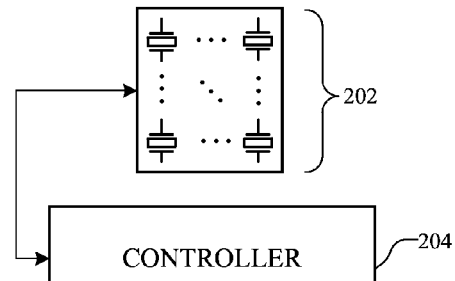
FIG. 2B depicts a simplified block diagram of another acoustic fingerprint imaging system.

In many examples, the acoustic transducers 202 can be arranged in a pattern. For example, in some embodiments the acoustic transducers 202 can be arranged in an evenly spaced line such as illustrated in FIG. 2A. In some embodiments, the acoustic transducers 202 can be arranged in a matrix or grid, as shown in FIG. 2B. In some examples, the matrix of the acoustic transducers 202 can be square or otherwise rectangular. In other examples, the matrix of the acoustic transducers 202 can take other shapes, such as a circular pattern (not shown).

Although many embodiments described herein distribute the acoustic transducers 202 in a uniform pattern (e.g., matrix, square, line, circle, and so on), such uniformity is not necessarily required.

The acoustic transducers 202 can be coupled to a controller 204. The controller 204 can be configured to provide electrical energy to each acoustic transducer of the acoustic transducers 202 independently. For example, the controller 204 can provide a first voltage to a first transducer and a second voltage to a second transducer. In addition, the controller 204 can control the duration and magnitude of the electrical energy applied to each independent acoustic transducer of the plurality of acoustic transducers 202.

In many examples, the controller 204 can operate in one or more modes. In certain embodiments, the controller 204 can have an interrogation mode. When in the interrogation mode, the controller 204 can be configured to provide electrical energy to one or more of the acoustic transducers 202 and in response, the acoustic transducers 202 can produce an acoustic output. In many embodiments, the electrical energy provided by the controller 204 can be an abbreviated electrical pulse. In response to the abbreviated electrical pulse, the one or more acoustic transducers 202 can produce a punctuated acoustic output.

Figure 2C:
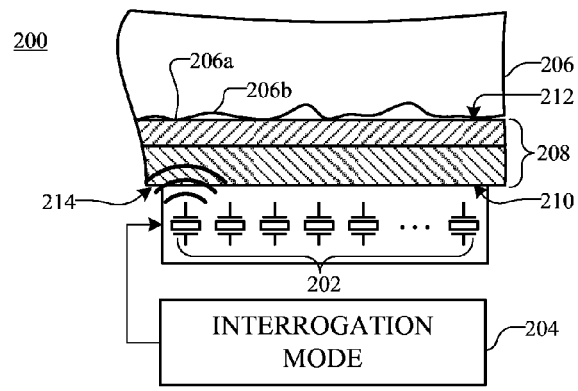
FIG. 2C depicts the acoustic fingerprint imaging system of FIG. 2A emitting an acoustic pulse toward an imaging surface.

In many embodiments, the acoustic fingerprint imaging system 200 can be disposed within a housing of an electronic device. For example, FIG. 2C depicts the acoustic fingerprint imaging system of FIG. 2A positioned below one or more layers of a substrate 208. As illustrated, the substrate 208 can have a bottom surface 210 and a top surface 212. The bottom surface 210 can be oriented to face the acoustic transducers 202, and the top surface 212 can be oriented to receive a user's finger 206, illustrated in simplified cross-section showing various ridges 206a and valleys 206b of the user's fingerprint. Although the bottom surface 210 and top surface 212 are shown as parallel, such a configuration may not be required in all embodiments.

As noted with respect to FIG. 1, the substrate 208 can be a portion of a display, a portion of an input device (e.g., button, switch, and so on), or a portion of the housing of the electronic device. Although illustrated as two separate layers of material, many embodiments can implement the substrate 208 as a single layer of material, or more than two layers of material. The substrate 208 can include active components (e.g., circuits, circuit traces, batteries, and so on) or passive components (e.g., glass sheet, metal sheet, and so on) or a combination thereof.

For example, if for a selected embodiment the substrate 208 is a portion of the housing of an electronic device, the substrate 208 can be formed from one or more layers of metal, glass, ceramic, plastic, and so on. In some embodiments, if the substrate 208 is a portion of a protective layer disposed above a display, the substrate 208 can be an optically transparent material such as glass, sapphire, plastic, and so on.

The acoustic transducers 202 can be positioned below the substrate 208 so as to be in acoustic communication with the bottom surface 210. In many examples, the acoustic transducers 202 are adhered to (or formed onto or into) the bottom surface 210. In this manner, when an acoustic transducer of the acoustic transducers 202 generates an acoustic output 214 in response to an activation signal from the interrogation-mode of the controller 204, the acoustic output 214 can propagate into the substrate 208 from the bottom surface 210 toward the top surface 212.

Figure 2D:
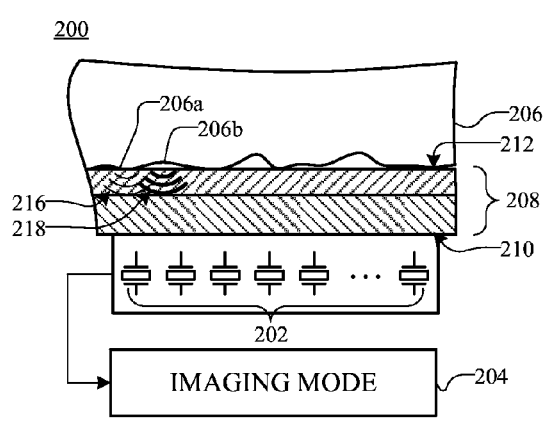
FIG. 2D depicts the acoustic fingerprint imaging system of FIG. 2A receiving an acoustic reflection from an imaging surface.

Once the acoustic output 214 reaches the top surface 212, the controller 204 can transition into an imaging mode, such as depicted in FIG. 2D. When in the imaging mode, the controller 204 can be configured to receive and analyze an electrical signal from one or more of the acoustic transducers 202 that corresponds to a portion of an acoustic reflection of the acoustic output 214 (see, e.g., FIG. 2C).

For example, in many embodiments, the acoustic reflection from a particular location along the top surface 212 may depend upon whether that location is below a ridge 206a or a valley 206b. More particularly, the acoustic boundary between the substrate 208 and a ridge 206a (which has an acoustic impedance of soft tissue) may cause a measurably smaller-amplitude acoustic reflection than the acoustic boundary between the substrate 208 and a valley 206b (which has an acoustic impedance of air).

For example, the percent $P_{diff}$ of amplitude of an acoustic reflection as a result of an acoustic boundary between two materials $M_1$ and $M_2$, having an acoustic impedance $Z_1$ and $Z_2$ respectively may be modeled as:

$$P_{diff} = \frac{\frac{Z_1}{Z_2} - 1}{\frac{Z_1}{Z_2} + 1} \quad \text{Equation 1}$$

In this example, if the acoustic impedances $Z_1$ and $Z_2$ of the two materials are substantially equal, the amplitude of any acoustic reflection is minimal or zero. On the other hand, if one of the two acoustic impedances $Z_1$ or $Z_2$ is larger than the other, $P_{diff}$ approaches ±1.0. In many examples, the direction of the wave (e.g., from a high impedance medium to a low impedance medium or the reverse) can determine whether the amplitude will be inverted upon reflection.

As noted above, the amplitude of a reflection from a ridge-substrate acoustic boundary may be smaller than the amplitude of a reflection from a valley-substrate acoustic boundary. In other words, the amplitude of an acoustic reflection 216 from an area of the top surface 212 that is below a ridge 206a may be less than the amplitude of an acoustic reflection 218 from an area of the top surface 212 that is below a valley 206b. Accordingly, the controller 204, when in an imaging mode, can monitor the amplitude of an acoustic reflection to derive, determine, assemble, or create, an image of the ridges and valleys of a user's fingerprint.

However, as noted above, the quality of the derived image may be directly affected by attenuation of the acoustic reflection. For example, an acoustic output 214 may not propagate through the substrate 208 uniformly and as a result, the acoustic reflection(s) 216, 218 and the image derived therefrom can be distorted.

Accordingly, to mitigate the effects of reflection attenuation, the acoustic fingerprint imaging system 200 can assemble the image of the user's finger 206 from a plurality of independently collected acoustic reflections. For example, the acoustic fingerprint imaging system 200 may activate each of the acoustic transducers in a particular temporal pattern such that the acoustic pulses produced by the transducers can constructively interfere at an interrogation point of the top surface 212 of the substrate.

For example, FIG. 3A depicts a simplified signal flow diagram of one embodiment of an acoustic fingerprint imaging system 300 in an interrogation mode configured to independently activate a number of acoustic transducers 302 such that that the acoustic pulses 304 produced by the transducers constructively interfere at a specific point, the interrogation point 306.

The acoustic fingerprint imaging system 300 can include an interrogation controller 308 which can be coupled to a clock circuit 310. The clock 310 can control and/or guide the operation of one or more digital functions or controls of the interrogation controller 308.

The interrogation controller 308 can also include a delay controller 312 which may be configured to provide a number of specific activation signals 314 to the acoustic transducers 302 via an addressing controller 316. The addressing controller 316 can direct each activation signal 314 to a specific acoustic transducer 302. For example, as illustrated, eight acoustic transducers 302 can receive eight independent specific activation signals 314.

Coupled to the delay controller 312 can be a pattern controller 318. The pattern controller 318 can be configured to determine a particular temporal pattern with which to activate the acoustic transducers 302 such that that the acoustic pulses 304 produced by the acoustic transducers 302 can constructively interfere at an interrogation point 306.

For example, as illustrated, the pattern controller 318 can determine that a first acoustic transducer $T_1$ may be physically closer to the interrogation point 306 then the eighth acoustic transducer $T_8$. Accordingly, because the distance between the eighth acoustic transducer $T_8$ and the interrogation point 306 is greater than the distance between the first acoustic transducer $T_1$ and the interrogation point 306, the eighth acoustic transducer $T_8$ should receive an activation signal 304 before the first acoustic transducer $T_1$. In other words, the propagation time $p_8$ f an acoustic pulse 304 from the eighth acoustic transducer $T_8$ to the interrogation point 306 is greater than the propagation time $p_1$ of an acoustic pulse 304 from the first transducer $T_1$ to the same interrogation point 306. Accordingly, the pattern controller 308 can communicate to the delay controller 312 to delay the activation of the first acoustic transducer $T_1$ by an amount equal to the difference in propagation delay, $p_8 - p_1$. In other words, the eighth acoustic transducer $T_8$ can be activated at time $t_0$ and the first acoustic transducer $T_1$ ca can be activated at time $t_0 + p_8 - p_1$. Similarly, the pattern controller 316 can determine a time for activating the other transducers.

In many embodiments, the pattern controller 318 can first determine which of the acoustic transducer(s) 302 is/are farthest from a selected interrogation point 306. The farthest transducer can be selected as the transducer that should be activated first. For example, as illustrated, the eighth acoustic transducer $T_8$ is farthest from the interrogation point 306. Once the pattern controller 318 determines which acoustic transducer(s) are farthest from the interrogation point, relative delays for each of the remaining acoustic transducers 302 can be calculated and submitted to the delay controller 312. In this manner, the timing of activation of each of the acoustic transducers is based on the physical location of each respective acoustic transducer. In some examples, the timing of activation of each of the acoustic transducers can be based on the pattern with which the acoustic transducers are disposed.

In other examples, the relative delays, relative distance, absolute propagation time, and/or absolute propagation distance between a particular interrogation point and particular transducer can be calculated beforehand and stored in a database or lookup table accessible to the pattern controller 318 and/or the delay controller 312. In further examples, the relative delays, relative distance, absolute propagation time, and/or absolute propagation distance between a particular interrogation point and a particular transducer can be measured directly or indirectly by the imaging system (e.g., timing the round trip time of an acoustic pulse and an acoustic reflection).

The pattern controller 318 can provide the temporal pattern to the delay controller 312 which can, in turn, apply a specific delay to each activation signal 314 to each transducer 302 according to the temporal pattern. In many embodiments, the temporal pattern can be based on the location of the interrogation point and on the pattern or arrangement with which the acoustic transducers are disposed. In many embodiments, the pattern controller 318 and the delay controller 312 can be coupled to a calibration controller 320 that can monitor that the output from the delay controller 312 matches the delays proscribed by the temporal pattern. In other words, the calibration controller 320 can ensure that the delay of each activation signal 314 is correct. For example, in some embodiments, changes in temperature can cause the delays output by the delay controller 312 to change.

In one example, if the delay controller 312 outputs a delay for a particular activation signal 314 that is longer than the delay determined for that activation signal 314 by the pattern controller 318, the calibration controller 320 can cause the delay controller 312 to reduce the delay applied to the particular activation signal 314.

As noted above, once the acoustic pulse (s) 304 reach the interrogation point 306, the acoustic fingerprint imaging system 300 can transition into an imaging mode, such as depicted in FIG. 3B. When in the imaging mode, the imaging system 300 be configured to receive and analyze one or more electrical signal(s) 322 from one or more of the acoustic transducers 302 that corresponds to a portion of an acoustic reflection 324 of the acoustic pulse 304 from the interrogation point 306.

Also as noted above, the greater the distance that an acoustic signal or an acoustic reflection travels, the more amplitude attenuation the signal may experience. For example, as illustrated, the electrical signal 322 received from the eighth acoustic transducer $T_8$ may have a lower amplitude than the electrical signal 322 received from the first acoustic transducer $T_1$. Once received, the electrical signal(s) 322 can be processed by an imaging controller 326 into an image, or a portion of an image corresponding to the interrogation point 306.

Once the acoustic reflection corresponding to the interrogation point is received and processed by the imaging controller 326, the imaging system 300 may select another interrogation point to target. In some examples, the acoustic reflection from a particular interrogation point can correspond to a sub-area of a final composite image. In other examples, a single interrogation point can correspond to a single pixel or a sub-pixel of a final composite image.

Figure 3C:
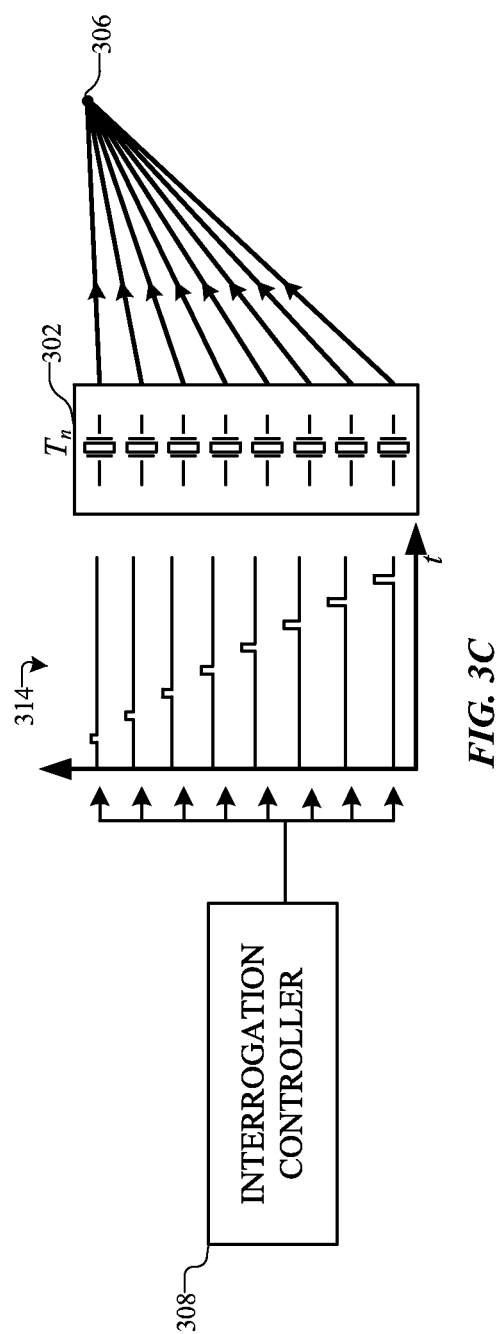
FIG. 3C depicts a simplified signal flow diagram of another acoustic fingerprint imaging system in an interrogation mode.

As noted above, in some embodiments, the imaging system 300 can also vary the amplitude of the electronic activation signals 314 of individual transducers 302 based on an expected attenuation of the acoustic pulse through the substrate, for example as shown in FIG. 3C. In this manner, the imaging system 300 can determine an appropriate activation amplitude for each transducer so each acoustic pulse arrives at the selected interrogation point at substantially the same amplitude.

Figure 4:
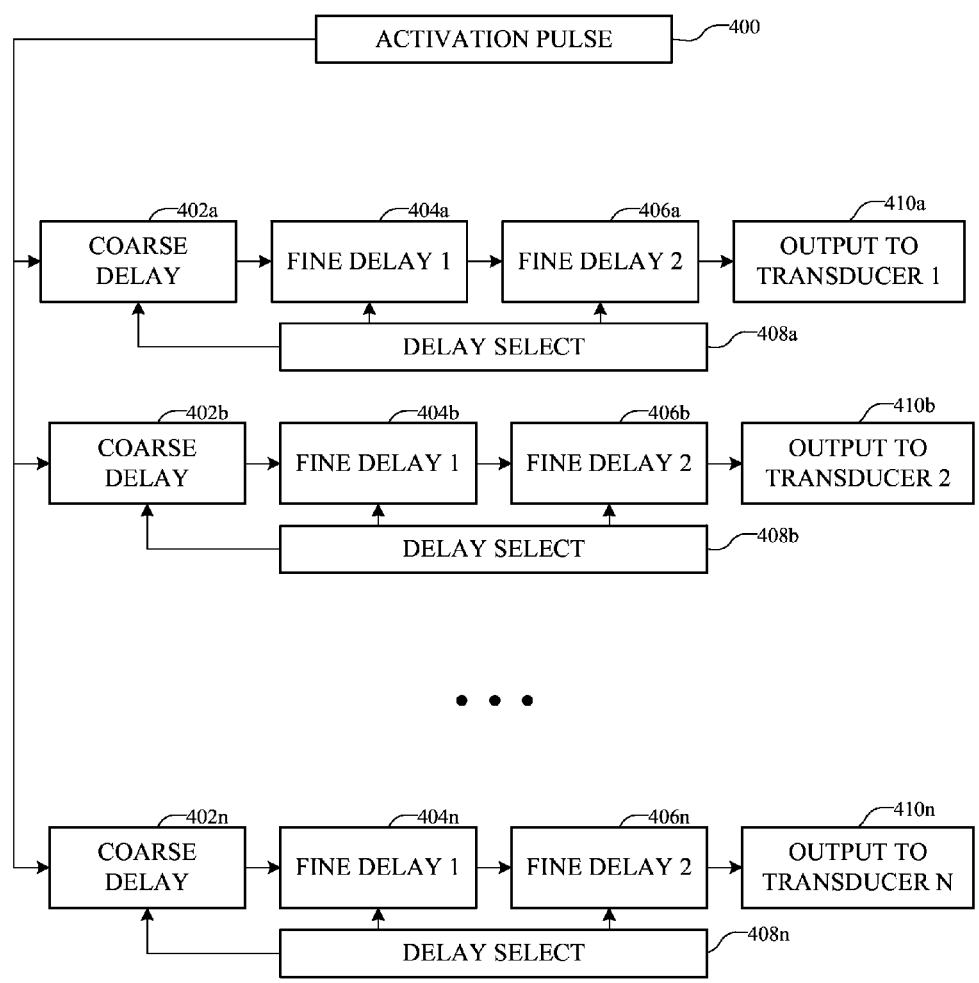
FIG. 4 depicts a simplified signal flow diagram of an example operation of a delay controller such as may be used with the imaging controller of FIG. 3A.

FIG. 4 depicts a simplified signal flow diagram of an example operation of a delay controller such as may be used with the imaging controller of FIG. 3A. The operation of the delay controller can begin with an activation pulse 400. In many examples the activation pulse 400 can be a pulse of electrical current such as, in one example, a square wave pulse of a selected duration. In many cases, the duration of the activation pulse 400 can be on the picosecond scale. In other examples, the activation pulse 400 can be another waveform, such as a one half of a period of sinusoidal wave.

The activation pulse 400 can be passed to one or more delay lines that are each associated with an individual transducer. For example, an arbitrary number N delay lines are shown. Each delay line can have one or more delay stages. For example, in many embodiments, a delay line can begin with a course delay 402. The course delay 402 can provide a specific delay to the activation pulse 400. For example, in certain embodiments, the coarse delay 402 can be configured to provide a fixed 10 ns delay to the activation pulse 400. In another example, the coarse delay 402 can be variable. For example, the coarse delay 402 can be configured, in certain embodiments to provide a delay of 10 ns to 100 ns in 10 ns increments. To select the delay provided by the coarse delay 402, the coarse delay 402 can be coupled to a delay selector 408.

After the coarse delay 402, each delay line may continue to another delay stage that can provide finer control, such as the first fine delay stage 404. For example the first fine delay stage 404 can provide a selectable delay of 1 ns to 10 ns in 1 ns increments. As with the coarse delay 402, the first fine delay stage 404 can be coupled to the delay selector 408.

After the first fine delay stage 404, each delay line may continue to another delay stage that can provide even finer delay control, such as the second fine delay stage 406. For example the second fine delay stage 406 can provide a selectable delay of 100 ps to 1 ns in 100 ps increments. As with the coarse delay 402 and the first fine delay stage 404, the second fine delay stage 406 can be coupled to the delay selector 408.

In other embodiments, additional or fewer delay stages can be used. For example in certain cases, a third fine delay stage can be used to provide a selectable delay of 10 ps to 100 ps. In other embodiments, a preliminary course delay can be used prior to the coarse delay 402.

Thereafter, the output of the second fine delay stage 406 can be passed to the specific transducer 410 that is coupled to the particular delay line. In this manner, the delay controller can provide an activation pulse to each transducer 410 at a specific and particular time.

Figure 5A:
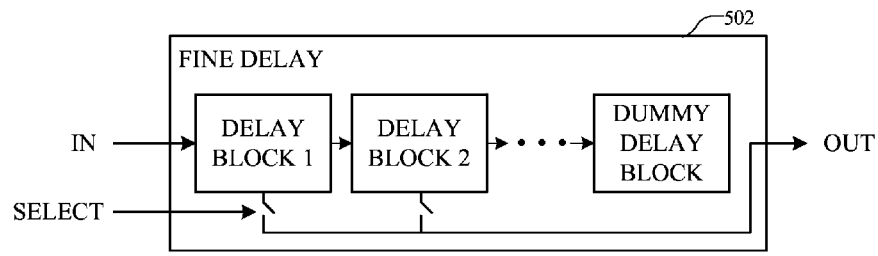
FIG. 5A depicts a simplified signal flow diagram of a delay stage of one delay line of an acoustic imaging system.

FIG. 5A depicts a simplified signal flow diagram of a delay stage of one delay line of an acoustic imaging system. The delay stage 502 can be a delay stage such as the coarse delay stage 402, the first fine delay stage 404, or the second fine delay stage 406 as illustrated in FIG. 4.

The delay stage 502 can include a number of individual delay blocks that can each provide a fixed or variable delay. For example, in some embodiments, the delay blocks can each provide a 1 ns delay. In other embodiments, each of the delay blocks can provide a 100 ns delay. In other examples, other delays can be used. In still further embodiments, different delays can be used within a single delay line. For example a first delay block can have a first delay and a second delay block can have a second delay.

Each delay block of the delay line can include at least one input and two outputs. For example, the input of each delay block can receive a signal to be delayed, such as an activation signal for a transducer. One of the two outputs of the delay block can be coupled to the next delay block in the delay line. For example, the one output of a first delay block can be coupled to the input of a subsequent delay block. A second output of each delay block can be selected as an output for the entire delay line. In many examples, a delay line can terminate with a dummy delay block. The dummy delay block can ensure that the penultimate delay block of the delay line experiences the same capacitive loading (and therefore propagation delay) as each of the delay blocks before it.

Figure 5B:
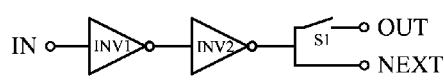
FIG. 5B depicts a simplified schematic diagram of a dual-inverter delay block.

As noted above, some embodiments can include delay blocks having fixed delays. For example, FIG. 5B depicts a simplified schematic diagram of a dual-inverter delay block having a fixed delay. The dual inverter delay block can include an input terminal, two inverters arranged in series, and two output terminals. As noted above, one of the output terminals can be coupled to a switch S1 so that the output of the delay block can be selected as an output for the entire delay line. In other embodiments, the dual-inverter delay block can include only a single output. In many examples, the fixed delay of the dual-inverter delay block can be set based, at least in part, on the elements selected to implement the block. For example, certain inverters may provide a longer delay than other inverters.

Figure 5C:
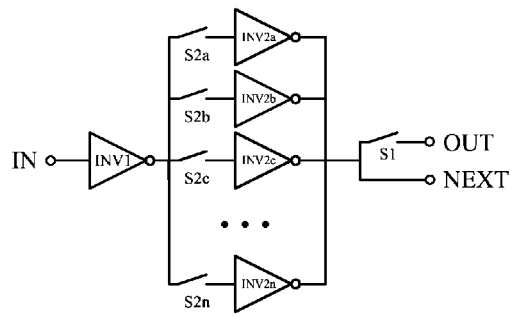
FIG. 5C depicts a simplified schematic diagram of a dual-inverter delay block implementing controllable propagation delay with digitally-selectable capacitive loading.

In other embodiments, each of the several delay blocks can provide a variable delay. In some examples, the delay of a variable-delay block can be controlled digitally by varying the capacitive loading of the first inverter of a dual-inverter delay block. For example, FIG. 5C depicts a simplified schematic diagram of a dual-inverter delay block implementing controllable propagation delay with digitally-selectable capacitive loading. In some embodiments, the propagation delay of a digital component can be directly related to the capacitive loading of that component. For example, an inverter under high capacitive load may experience a longer propagation delay than an inverter under lower capacitive load.

As illustrated, the dual-inverter delay block of FIG. 5C shows a first coupled in series to a set of second inverters coupled to one another in parallel. By progressively activating (e.g., by enabling switches S2a-S2n) additional 'second' inverters, the capacitive load experienced by the first inverter can increase. In another, non-limiting phrasing, by increasing the fan-out of the first inverter, the propagation delay of the first inverter can be controlled.

Figure 5D:
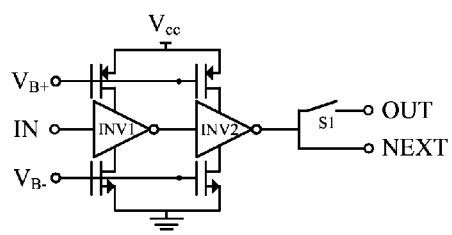
FIG. 5D depicts a simplified schematic diagram of a dual-inverter delay block implementing controllable propagation delay with a voltage-controlled current-starving load.

In other embodiments, each of the several delay blocks can provide a variable delay by starving one or both of the inverters of a dual-inverter delay block of current. For example, FIG. 5D depicts a simplified schematic diagram of a dual-inverter delay block implementing controllable propagation delay with a voltage-controlled current-starving load. As illustrated, a positive bias voltage can be applied to the gate of a PMOS (e.g., current source) and a negative bias voltage can be applied to the gate of an NMOS (e.g., current sink), so that current through the first and second inverters can be controlled by varying the bias voltages. In many embodiments, increasing the bias voltage can increase the current through each of the first and second inverters, which, in turn, can decrease the propagation delay of the delay block. By varying the voltage, the delay of the delay block can be controlled.

Figure 5E:
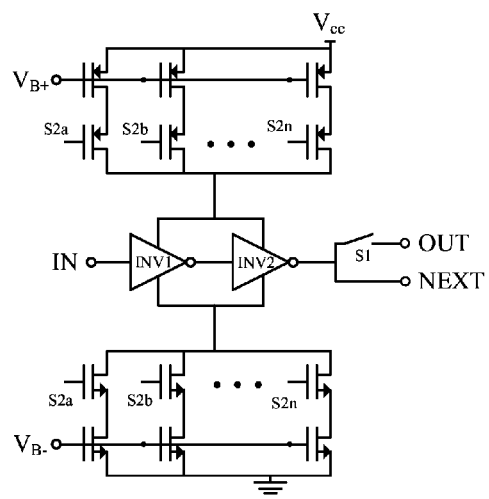
FIG. 5E depicts a simplified schematic diagram of a dual-inverter delay block implementing controllable propagation delay with a digitally-selectable current-starving load.

In another embodiment, current can be controlled by progressively enabling additional current sources and additional current sinks. For example, FIG. 5E depicts a simplified schematic diagram of a dual-inverter delay block implementing controllable propagation delay with a digitally-selectable current-starving load. In this example, one or more current paths (e.g., switchable current sources and current sinks, arranged in parallel) can be selectively enabled. As additional current paths are enabled, additional current can flow into the first and second inverter of the dual-inverter delay block. In this embodiment, both bias voltage and the number of current paths can be varied to provide additional control.

Figure 6:
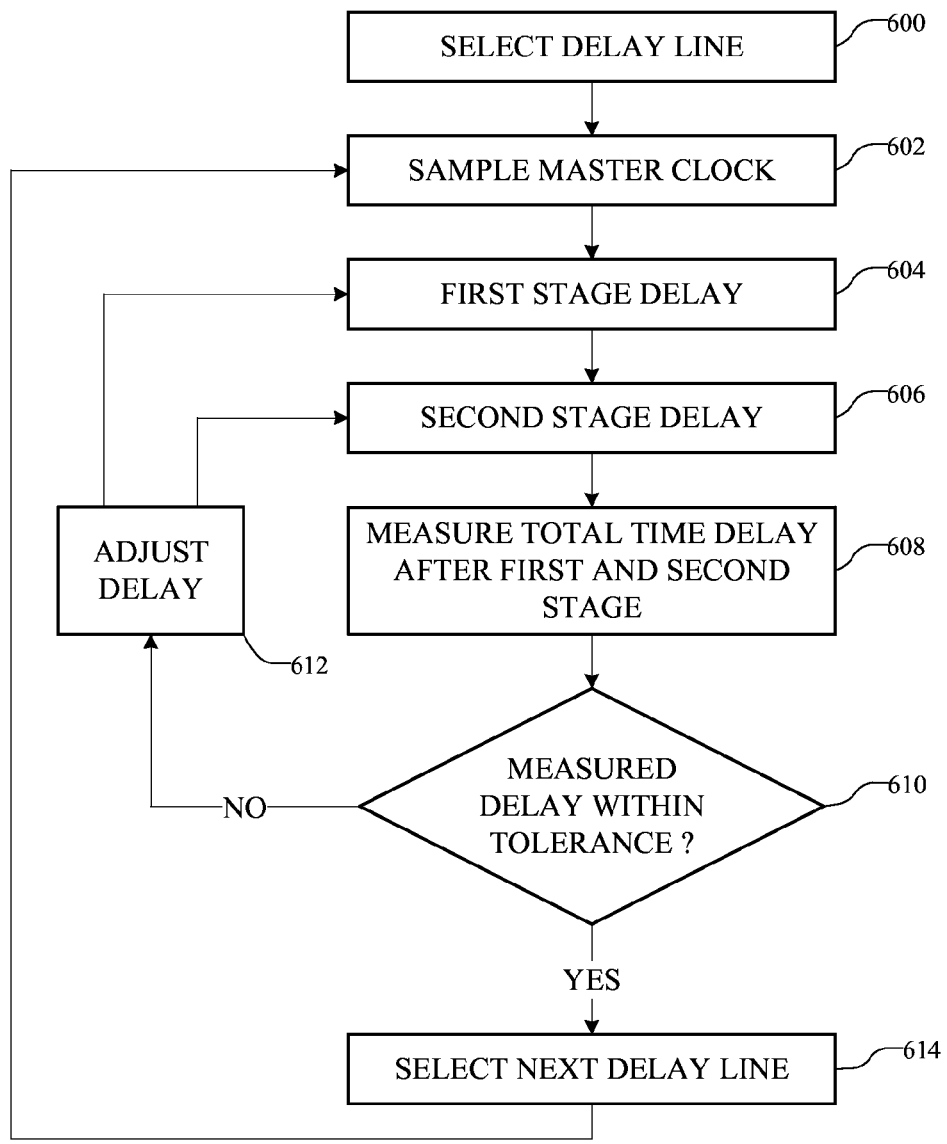
FIG. 6 is a flow chart depicting example operations of a method of calibrating a delay line of an acoustic imaging system using delay monitoring.

FIG. 6 is a flow chart depicting example operations of a method of calibrating a delay line of an acoustic imaging system using delay monitoring. The method can begin operation 600 by selecting a delay line in need of calibration. Next, a master clock that is configured to have minimum jitter is sampled at operation 602. In many embodiments, the frequency of the master clock can be selected or set such that one period of the master clock is the same duration as the pulse that can be applied to an acoustic transducer. Next, a first delay stage can provide a delay to the signal output from the master clock at operation 604. In many embodiments, the first delay can be variable. Next a second delay stage can provide a second delay to the signal output from the first delay stage at 606. As with the first delay stage, the second delay stage can be variable.

In this manner, the second delay stage can add delay to the delay applied by the first delay stage. This total delay can be measured at operation 608. In many examples, the total delay can be measured by a time to digital converter. Next the measured delay can be compared to the total delay that was expected from each of the first and second delay stages at operation 610. If the difference between the measured delay and the expected delay is below a selected threshold tolerance, then the method can continue to operation 614 at which another delay line can be selected for calibration.

However, if the difference between the measured delay and the expected delay is larger than the selected threshold tolerance, then the method can continue to operation 612 during which the delays of the first delay stage and/or second delay stage can be adjusted in a loop until the measured delay matches the expected delay. Although the method depicted by FIG. 6 is referenced with respect to calibration of delay lines, one can appreciate that individual delay blocks within delay lines can be calibrated using a similar technique.

Figure 7:
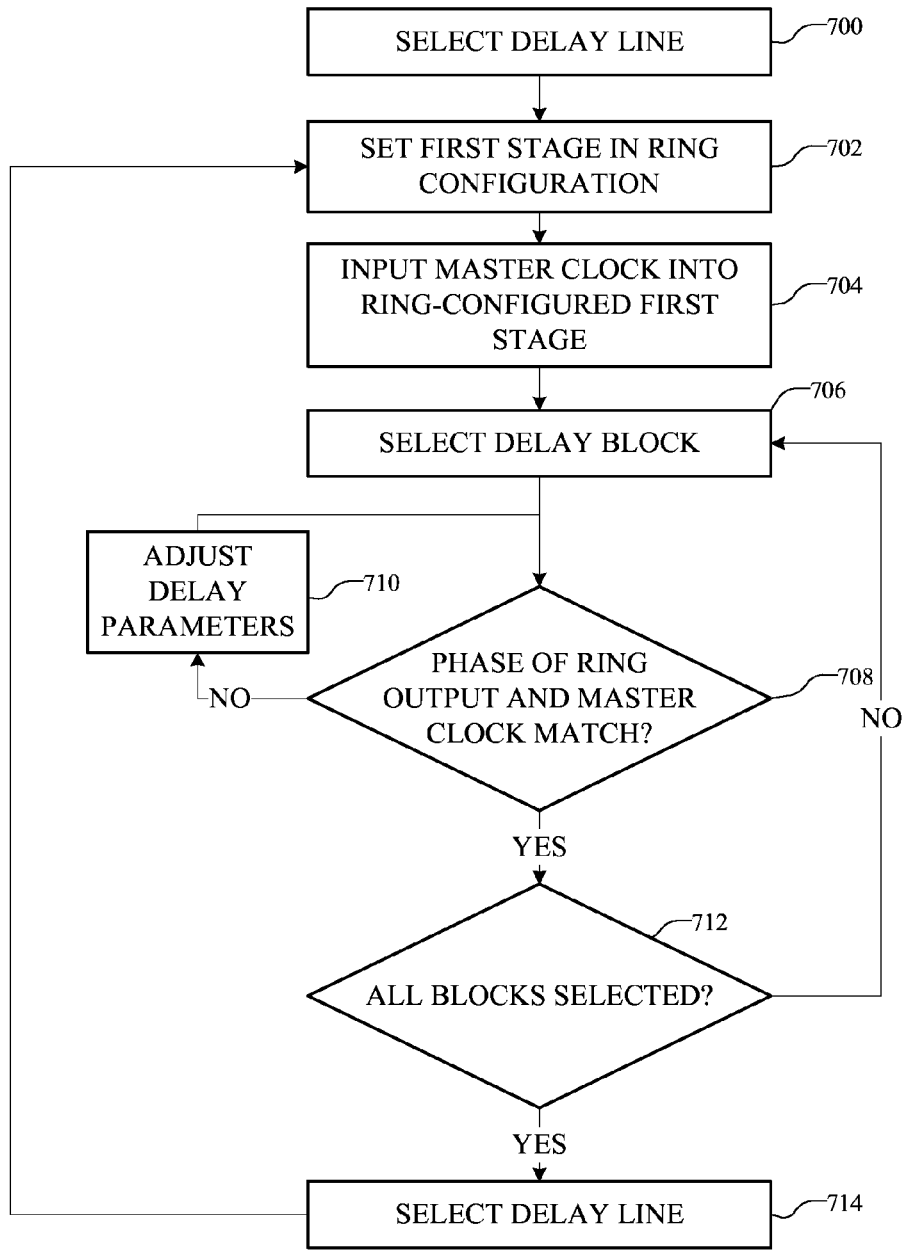
FIG. 7 is a flow chart depicting example operations of a method of calibrating a delay line of an interrogation controller with phase monitoring.

FIG. 7 is a flow chart depicting example operations of a method of calibrating a delay line of an interrogation controller with phase monitoring. The method can begin operation 700 by selecting a delay line in need of calibration. Next, at operation 702, a first stage of the delay line can be set into a ring configuration. In one example, if a first stage includes ten independent delay blocks, a ring configuration can be implemented by coupling the output of the tenth block to the input of the first block. In this manner, by selectively enabling a single output switch (e.g., S1) for a certain delay block, the delay applied by all delay blocks collectively can be tapped. Next at operation 704, a master clock that is configured to have minimum jitter is sampled and input into the ring-configured delay line. In many embodiments, the frequency of the master clock can be selected or set such that one period of the master clock is the same as the maximum duration of the first delay line.

Next one of the delay blocks of the selected delay line can be itself selected at operation 706. Continuing the ten-block delay line of the example above, the output of a first delay block can be selected by enabling the respective output switch (e.g., S1). Next, at operation 708, the phase of the sampled master clock signal and the signal output from the ring-configured delay line can be compared. In this manner, when the sample of the master clock, having a period equal to the delay of the first delay line, is passed through the first delay line, the output of the first delay line and the original sampled master clock signal should have substantially identical phase if the first delay line is calibrated properly. Thus, if the phases of the two signals match, the operation can continue to operation 712 during which the next delay block of the several delay blocks can be selected.

However, if the phase of the output of the first delay line and the phase of the sampled master clock do not match, then the method may determine that the delay parameters of the delay block should be adjusted at operation 710. For example, if the phase of the output of the first delay line is leading the phase of the sampled master clock, it may be determined that the selected delay block is providing too great of a delay. Accordingly, the delay of the selected delay block should be reduced. On the other hand, if the phase of the output of the first delay line is lagging the phase of the sampled master clock, it may be determined that the selected delay block is not providing enough of a delay, and that the delay should be increased.

Once all blocks of the delay line are selected (block 712), the method can continue to operation 714 at which the next delay line can be selected.

In many embodiments, the operation 710 can change the parameters of only the single selected delay block. However, in other embodiments, the operation 710 can change the parameters of all delay blocks within the selected delay line. For example, in certain embodiments it can be presumed that each of the several delay blocks of a single delay line are under substantially similar conditions. For example, each of the several delay blocks may have the same temperature. As noted above, temperature changes can impact the propagation delay of individual delay blocks, or elements within individual delay blocks. Accordingly, certain calibration methods can benefit from adjusting all delay blocks based on a measurement or phase comparison obtained from a single delay block.

Figure 8:
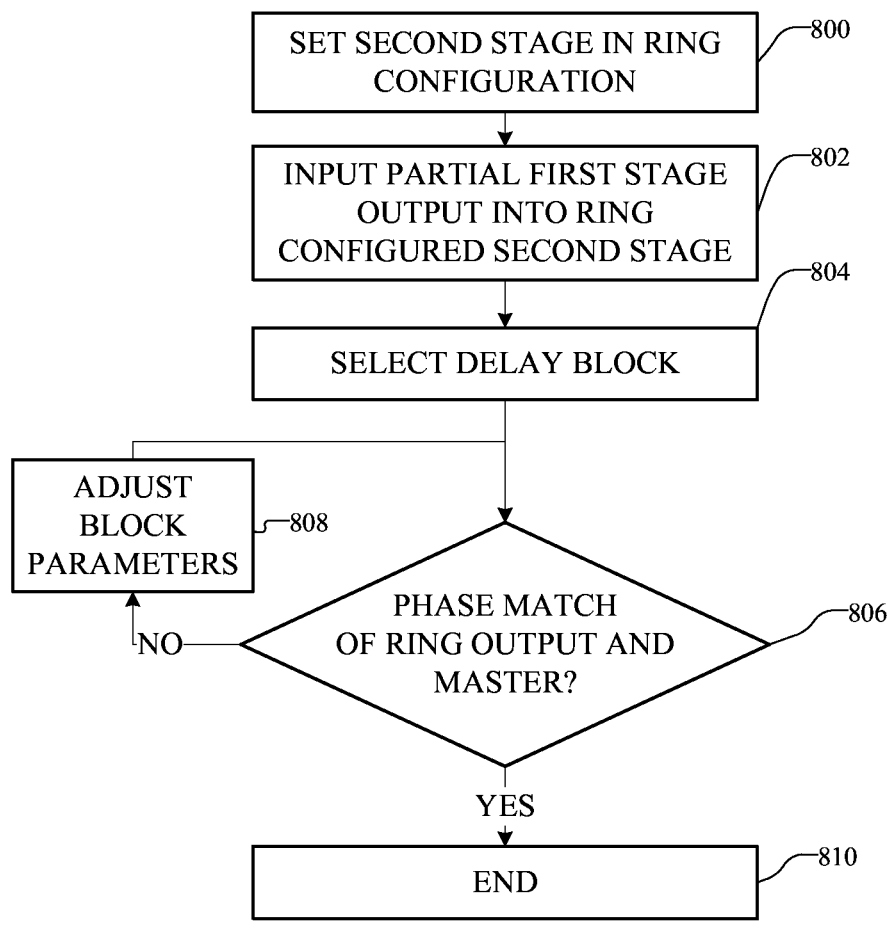
FIG. 8 is a flow chart depicting example operations of another method of calibrating a delay line of an interrogation controller with phase monitoring.

FIG. 8 is a flow chart depicting example operations of another method of calibrating a second delay line of an interrogation controller with phase monitoring. The method can begin at operation 800 in which a second stage of a delay line is set into a ring configuration, as, for example, discussed above with respect to the first delay line of FIG. 7. Next at operation 802, a portion of the output of a calibrated first stage can be input into the ring-configured second stage. In one example, the second stage can be made from ten independent delay blocks, the entire delay line configured to provide a tenth of the delay of one block of the first delay line.

For example, if the first delay line contains ten delay blocks, each configured to provide a delay of 1 ns, the second delay line can include ten delay blocks each configured to provide a delay of 100 ps. In this example, the output of the ninth delay block from the first delay line can be coupled to the input of the second delay line. In this manner, the total delay of the first and second delay lines can be compared to the sampled master clock, such as noted above with respect to operation 704 of the method depicted in FIG. 7. As with the operation depicted in FIG. 7, the phase of the total delay of the first and second delay lines can be compared to the phase of the sampled master clock. If the two signals are found to be in phase, then the operation can continue to 810. If the two signals are found to be out of phase, individual delay block parameters of the second delay line can be adjusted.

Figure 9:
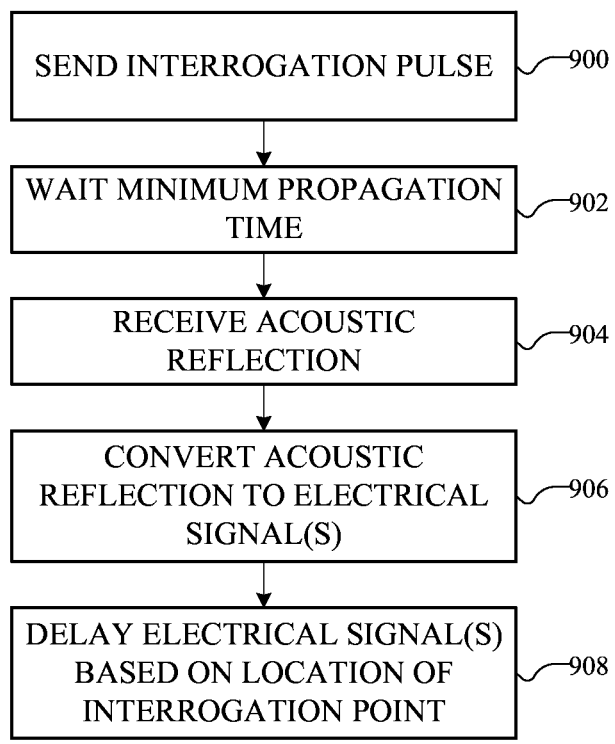
FIG. 9 is a flow chart depicting example operations of a method of operating an acoustic fingerprint imaging system.

FIG. 9 is a flow chart depicting example operations of a method of operating an acoustic fingerprint imaging system. The method can begin at operation 900 at which an interrogation pulse is sent. In many examples, and as described with respect to other embodiments herein, an interrogation pulse can be sent toward an interrogation surface of a substrate by an acoustic transducer.

Next, the method can wait a minimum period of time that is equal to the expected propagation time of the interrogation pulse at operation 902. In many embodiments, the expected propagation time can be a round-trip time. Next, at operation 904, an acoustic reflection can be received. Thereafter at 906, the acoustic reflection can be converted into an electrical signal(s) by one or more acoustic transducer(s). Next, at operation 908, the electrical signals received from one or more transducers can be delayed. In this manner, all electrical signals associated with a particular interrogation point can be collected and read at substantially the same time.

Figure 10:
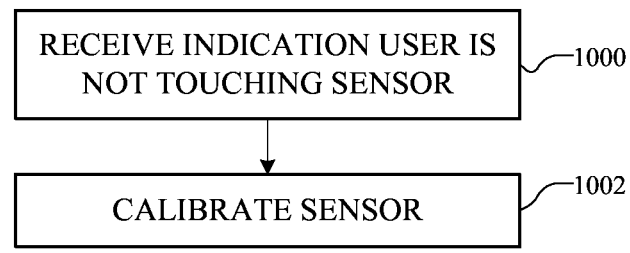
FIG. 10 is a flow chart depicting example operations of a method of operating an acoustic fingerprint imaging system.

FIG. 10 is a flow chart depicting example operations of a method of operating an acoustic fingerprint imaging system. The method can begin at operation 1000 during which an indication is received that a user is not touching the substrate associated with an imaging sensor. For one example, a touch sensor associated with a display of a portable electronic device can communicate to the sensor that the touch screen is not being touched. Next, one or more calibration methods can be initiated at operation 1002. In this manner, an acoustic fingerprint imaging system can calibrate and account for changes in environmental conditions that might affect imaging of a user's fingerprint.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

I claim:

1. A fingerprint imaging system comprising:
   a substrate comprising:
      a top surface for receiving a subject for imaging; and
      a bottom surface opposite the top surface;
   a plurality of transducers in acoustic communication with the bottom surface, each configured to produce an acoustic output into the substrate toward the top surface in response to an electronic activation signal; and a beam-forming controller configured to provide the electronic activation signal separately to each transducer of the plurality of transducers such that the acoustic output produced by each respective transducer, as a result of the respective activation signals, arrives at an interrogation point of the top surface simultaneously; wherein:
the interrogation point corresponds to a portion of a fingerprint image.

2. The fingerprint imaging system of claim 1, wherein the beam-forming controller further comprises a plurality of delay lines, each delay line associated with a single one of the plurality of transducers.

3. The fingerprint imaging system of claim 2, wherein at least one of the plurality of delay lines comprises a first delay line stage comprising a first plurality of delay blocks.

4. The fingerprint imaging system of claim 3, wherein the at least one of the plurality of delay lines further comprises a second delay line stage comprising a second plurality of delay blocks.

5. The fingerprint imaging system of claim 3, wherein at least one of the first plurality of delay blocks comprises a dual-inverter delay element having a first fixed propagation delay.

6. The fingerprint imaging system of claim 3, wherein at least one of the first plurality of delay blocks comprises a dual-inverter delay element having a voltage-controlled propagation delay.

7. The fingerprint imaging system of claim 3, wherein at least one of the first plurality of delay blocks comprises a two inverter delay element, wherein a second inverter of the two inverter delay element comprises a plurality of individual inverters arranged in parallel, each configured to be selectively enabled or disabled.

8. The fingerprint imaging system of claim 5, wherein at least one of the second plurality of delay blocks comprises a dual-inverter delay element having a second fixed propagation delay, wherein the second fixed propagation delay is less than the first fixed propagation delay.

9. The fingerprint imaging system of claim 7, wherein the second fixed propagation delay is one tenth of the first fixed propagation delay.

10. The fingerprint imaging system of claim 4, wherein at least one of the second plurality of delay blocks comprises a dual-inverter delay element having a voltage-controlled propagation delay.

11. The fingerprint imaging system of claim 4, wherein at least one of the second plurality of delay blocks comprises a two inverter delay element, wherein a second inverter of the two inverter delay element comprises a plurality of individual inverters arranged in parallel, each configured to be selectively enabled or disabled.

12. The fingerprint imaging system of claim 4, wherein at least one of the second plurality of delay blocks comprises a dual-inverter delay element having a current-controlled propagation delay.

13. The fingerprint imaging system of claim 1, wherein the beam-forming controller is further configured to select the interrogation point from a plurality of interrogation points.

14. A fingerprint imaging controller in communication with a plurality of acoustic transducers coupled to the bottom surface of a substrate, the fingerprint imaging controller comprising:
a pattern controller for selecting an interrogation point on the top surface of the substrate; and
a delay controller configured to provide an electronic activation signal separately to each transducer of the plurality of acoustic transducers such that an acoustic output produced by each respective acoustic transducer arrives at the interrogation point simultaneously; wherein:
the interrogation point corresponds to a portion of a fingerprint image.

15. The fingerprint imaging controller of claim 14, wherein the delay controller further comprises a plurality of delay lines, each delay line associated with a single one of the plurality of transducers.

16. The fingerprint imaging controller of claim 15, wherein at least one of the plurality of delay lines comprises a first delay line segment comprising a plurality of delay blocks.

17. The fingerprint imaging controller of claim 16, wherein at least one of the plurality of delay blocks comprises a dual-inverter delay element having a first fixed propagation delay.

18. The fingerprint imaging controller of claim 16, wherein at least one of the plurality of delay blocks comprises a dual-inverter delay element having a voltage-controlled propagation delay.

19. The fingerprint imaging controller of claim 16, wherein at least one of the plurality of delay blocks comprises a dual-inverter delay element having a current-controlled propagation delay.

20. The fingerprint imaging controller of claim 16, wherein at least one of the plurality of delay blocks comprises a two inverter delay element, wherein a second inverter of the two inverter delay element comprises a plurality of individual inverters arranged in parallel, each configured to be selectively enabled or disabled.

* * * * *